United States Patent
Cali' et al.

(10) Patent No.: US 6,493,737 B1
(45) Date of Patent: Dec. 10, 2002

(54) METHOD AND CIRCUIT FOR COMPUTING THE DISCRETE COSINE TRANSFORM (DCT) IN MICROCONTROLLERS

(75) Inventors: Lorenzo Cali', Reggio Calabria (IT); Pier Luigi Rolandi, Monleale (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/342,601

(22) Filed: Jun. 29, 1999

Related U.S. Application Data
(60) Provisional application No. 60/091,080, filed on Jun. 29, 1998.

(51) Int. Cl.[7] .............................................. G06F 17/14
(52) U.S. Cl. ...................................... 708/402; 382/250
(58) Field of Search ........................... 708/402; 382/250

(56) References Cited

U.S. PATENT DOCUMENTS

| | | | | |
|---|---|---|---|---|
| 5,703,799 A | * | 12/1997 | Ohta | 708/402 |
| 5,867,601 A | * | 2/1999 | Phillips | 708/402 |
| 5,946,039 A | * | 8/1999 | Ben-Arie et al. | 708/402 |
| 5,995,990 A | * | 11/1999 | Henry | 708/402 |
| 6,047,089 A | * | 4/2000 | Abe | 382/250 |
| 6,119,140 A | * | 9/2000 | Murata et al. | 708/402 |
| 6,160,920 A | * | 12/2000 | Shyu | 382/250 |
| 6,173,080 B1 | * | 1/2001 | Cho et al. | 382/250 |
| 6,189,021 B1 | * | 2/2001 | Shyu | 708/402 |
| 6,327,602 B1 | * | 12/2001 | Kim | 708/402 |

OTHER PUBLICATIONS

Park et al., Area Efficient VLSI Architectures for Huffman Coding, IEEE Transactions on Circuits and Systems–II: Analog and Digital Signal Processing, vol. 40, No. 9, Sep. 1993, pp. 568–575.

Schaumont et al., Synthesis of Pipelined DSP Accelarators With Dynamic Scheduling, IEEE Transactions on Very Large Scale Integration (VLSI) Systems, vol. 5, No. 1, Mar. 1997, pp. 59–68.

* cited by examiner

*Primary Examiner*—David H. Malzahn
(74) *Attorney, Agent, or Firm*—Lisa K. Jorgenson; Allen, Dyer, Doppelt, Milbrath & Gilchrist, P.A.

(57) ABSTRACT

A method and circuit computes a Discrete Cosine Transform in a more efficient manner for improving the computation speed, thereby reducing the computation time and allowing a higher number of digital samples to be processed. The circuit provides a microcontroller that includes a parallel accumulation multiplier for performing a first transform of the input data. A further quantization step is then performed on the transformed data. Likewise, the method includes the first transform being computed by the parallel accumulation multiplier. A further quantization step is performed on the transformed data. In this respect, the method and circuit provides good performance in terms of compression rate.

29 Claims, 1 Drawing Sheet

METHOD AND CIRCUIT FOR COMPUTING THE DISCRETE COSINE TRANSFORM (DCT) IN MICROCONTROLLERS

RELATED APPLICATIONS

This application is based upon prior filed provisional application Serial No. 60/091,080 filed on Jun. 29, 1998, the entire contents of which is incorporated herein by reference.

FIELD OF THE INVENTION

The present invention relates to the field of electronics, and, more particularly, to signal processing of digital video image data.

BACKGROUND OF THE INVENTION

The encoding of video signals requires processing of a very high number of samples, e.g., millions per second. The sample flow is normally processed by many processors operating in parallel. In these applications, a two-dimensional Discrete Cosine Transform (DCT) is used on small input size signals to increase the calculation speed of the digital image compression process. The use of DCTs is disclosed, for example, in the article: "FAST ALGORITHMS FOR THE DISCRETE COSINE TRANSFORM", by E. Feig and S. Winograd, IEEE Transactions on Signal Processing, Vol. 40, No. 9, September 1992.

The transformation phase is an important step of the digital image compression process since it allows compression of the information associated with the input signal. For instance, an 8×8 matrix image block is compressed into a relatively small number of coefficients. The calculation of the DCT is also used in the definition of the JPEG Standard for image compression. The calculation of the DCT involves a particularly large number of operations, typically on the order of $O(N^2)$. The variable N denotes the number of points to which the transform is applied. A number of fast calculating algorithms have been developed in an effort to lower the number of necessary operations.

A system for DCT calculation is disclosed in U.S. Pat. No. 5,197,021, titled "SYSTEM AND CIRCUIT FOR THE CALCULATION OF THE BIDIMENSIONAL DISCRETE TRANSFORM". Another solution is disclosed by W. Pennebaker and J. Mitchell, in the article: "STILL IMAGE DATA COMPRESSION STANDARD," Van Nostrand Reinhold, New York, 1993. However, when an implementation of such approaches is sought on systems in which the critical calculation depends on various factors, a substantial loss in algorithm efficiency is often incurred. This destroys any attempt in lowering the cost in terms of duty cycles required to complete the computation phase.

SUMMARY OF THE INVENTION

An object of the present invention is to provide a technique for computing a bidimensional Discrete Cosine Transform (DCT) in a more efficient manner.

Another object of the invention is to provide a method for computing a DCT using a less complicated circuit, such as using a single microcontroller for computing the DCT.

Yet another object of the invention is to provide a circuit for reducing the computation time for computing a DCT.

The method and circuit according to the present invention computes a Discrete Cosine Transform in a more efficient manner for improving the computation speed, thereby reducing the computation time and allowing a higher number of digital samples to be processed.

The circuit provides a microcontroller that includes a parallel accumulation multiplier for performing at least a first transform of the input data. A further quantization step is then performed on the transformed data. Likewise, the method includes at least the first transform being computed by a parallel accumulation multiplier. IA further quantization step is performed on the transformed data. In this respect, the method and circuit provides good performance in terms of compression rate. The above cited features of the circuit are thus used to optimize the calculation times.

BRIEF DESCRIPTION OF THE DRAWINGS

The features and advantages of the inventive method and circuit architecture will be understood by the following description of a best mode of implementation given by way of indication and a non-limiting example with reference to the following drawings.

DETAILED DESCRIPTION OF THE PREFERRED EMBODIMENTS

For a better understanding of the method and circuit according to the present invention, definition of a Forward Discrete Cosine Transform (FDCT) will be discussed below:

$$S(u, v) = \frac{C(v)}{2} \frac{C(u)}{2} \sum_{y=0}^{7} \sum_{x=0}^{7} s(y, x)\cos\left[\frac{(2x+1)u\pi}{16}\right]\cos\left[\frac{(2y+1)v\pi}{16}\right] \quad [a]$$

where $C(v) = 1/\sqrt{2}$, when $v=0$ $C(v) = 1$, when $v>0$

The input data are $s(y,x)$, and $S(v,u)$ are the DCT coefficients. From the above formula the two summations may be split as follows:

$$S(v, u) = \frac{C(v)}{2} \sum_{y=0}^{7} \cos\left[\frac{(2y+1)v\pi}{16}\right] \left(\frac{C(u)}{2} \sum_{x=0}^{7} s(y, x)\cos\left[\frac{(2x+1)u\pi}{16}\right]\right)$$

Hence, putting $$t_u(y) = \frac{C(u)}{2} \sum_{x=0}^{7} s(y, x)\cos\left[\frac{(2x+1)u\pi}{16}\right]$$

The equation [a] can be re-written as:

$$S(v, u) = \frac{C(v)}{2} \sum_{y=0}^{7} \cos\left[\frac{(2y+1)v\pi}{16}\right] t_u(y)$$

Thus, [a] has been reduced to a successive application of two unidimensional DCTs.

The 8×8 matrix of elements $t_u(y)$ can be represented as follows:

$$\begin{pmatrix} t_0(0) & t_1(0) & t_2(0) & t_3(0) & \dots \\ t_0(1) & t_1(1) & & & \\ t_0(2) & & & & \\ t_0(3) & & & & \\ \dots & & & & \end{pmatrix} \quad [b]$$

An algorithm used for calculating the above matrix is disclosed in the above referenced article: "FAST ALGORITHMS FOR THE DISCRETE COSINE TRANSFORM", by E. Feig and S. Winograd. This article discloses the use of the symmetry present in the DCT equations to lower the number of operations required for the calculation.

If the following quantity is defined as $C_k = \cos(k\Pi/16)$ and if s(n) is an eight point vector, by calculating the following sums $s_{jk}=s(j)+s(k)$ and the following differences $d_{jk}=s(j)-s(k)$, the equations for determining the DCT coefficients can be written in the following formulas:

$$2S(0)=C_4(s_{0734}+s_{1625})$$

$$2S(1)=C_1d_{07}+C_3d_{16}+C_5d_{25}+C_7d_{34}$$

$$2S(2)=C_2d_{0734}+C_6d_{1625}$$

$$2S(3)=C_3d_{07}-C_7d_{16}-C_1d_{25}-C_5d_{34}$$

$$2S(4)=C_4(s_{0734}-s_{1625})$$

$$2S(5)=C_5d_{07}-C_1d_{16}+C_1d_{25}+C_3d_{34}$$

$$2S(6)=C_6d_{0734}-C_2d_{1625}$$

$$2S(7)=C_7d_{07}-C_5d_{16}+C_3d_{25}-C_1d_{34} \quad [c]$$

Thus, if the points s(0,x) are initially taken as inputs, the $t_u(0)$ vector is obtained, i.e., the first row in the temporary [b] matrix. However, at the next step, which is necessary to calculate the final points of the bidimensional DCT, the $t_0(y)$ vector is needed. Therefore, it is necessary that the first column in matrix [b] be determined in advance. At this stage, by applying again the first dimension (1-D) algorithm, the following are obtained: S(0,0), S(1,0), S(2,0) . . . , which is the column of a new matrix. By repeating for the t,(y) vectors, the entire second direction (2-D) DCT points can be obtained.

Figure 1:
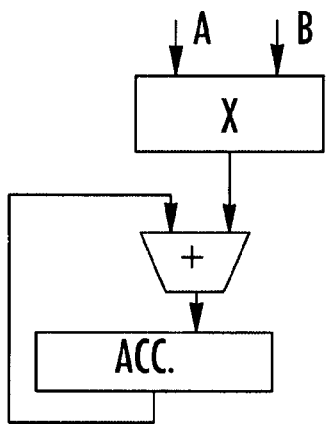
FIG. 1 is a circuit diagram illustrating a parallel accumulator multiplier included in a circuit architecture according to the present invention.

While the overall number of operations required to calculate the DCT may be large, the above-discussed technique optimizes certain characteristics of microcontrollers. The overall large number of operations is despite the use of a fast algorithm for calculating the 1-D DCT. As illustrated in FIG. 1, a microcontroller architecture may be provided with a parallel accumulator multiplier. This allows the results of previously carried out multiplications to be accumulated. In this manner, not all the sums will have to be calculated. However, an exception to this is with respect to finding the $s_{jk}$ and $d_{jk}$ values.

The next step to the transformation phase is a quantization phase. The multiplication factor 2 appearing in the S(i) equations group [c] can be included into the quantization coefficient. Furthermore, by dividing both terms of equations [c] through one of the coefficients $C_i$, the number of multiplications can be further reduced. As will be appreciated, such coefficients should also be included in the quantization factor of the subsequent phase.

Before describing the additional measures taken to optimize the computational cost of the DCT according to the invention, the implementation of the algorithm on microcontrollers does not include any operations involving real or floating point numbers. These operations would not be supported by the microcontroller. Accordingly, the multiplication of real numbers are handled as operating with integers.

The coefficients $C_i$, which are real numbers, are converted to integers through a change of base with a multiplication by a power of 2 (leftward shift), and a loop of the fractional portion. On the other hand, the s(y,x) input data are left unaltered since these are image samples represented by eight bits, including a sign, which have undergone a level shift, i.e., have values in the range between −128 and +127 range.

Multiplications by a power of 2, as well as divisions, require a minor computational effort since they consist of a shift of the operand bits to the left or to the right through a number of places equal to the exponent. At this point, the multiplication of the coefficients $C_i$ by the $s_{jk}$ or $d_{jk}$ values yields a result which is not aligned, in terms of exponential base, to the elements which have not been multiplied. For example, in the following expression $s_{lm}+s_{jk}C_i$, $s_{lm}$ should also be aligned to the exponent as has been used for converting the real number $C_i$ to an integer.

It will be appreciated that, were this transformation to be repeated on nearly all of the equations which yield the points of the 1-D DCT, a loss in efficiency of the algorithm under consideration would be experienced. However, by dividing, for example, the 2nd, 4th, 6th and 8th equations by the $d_{07}$ multiplying coefficient, and the 3rd and 7th equations by the $d_{0734}$ multiplying coefficient, the alignment operations only needs to be carried out on $d_{07}$ and $d_{0734}$. With the 1st and 5th equations, the problem does not exist because the division by $C_4$ will eliminate the multiplication operations.

In view of the above discussion, the 1-D algorithm is applied twice. A first time to s(y,x) and a second time to $t_u(y)$. The following is ultimately obtained:

$$4\begin{pmatrix} \dfrac{S(0,0)}{C_4^2} & \dfrac{S(0,1)}{C_4C_1} & \dfrac{S(0,2)}{C_4C_2} & \dots \\ \dfrac{S(1,0)}{C_1C_4} & \dfrac{S(1,1)}{C_1^2} & \dfrac{S(1,2)}{C_1C_2} & \\ \dfrac{S(2,0)}{C_2C_4} & & & \\ \dots & & & \end{pmatrix}$$

The coefficients of the 2-D DCT are, therefore, divided by $C_i$. Specifically, the divisions by the squares of $C_i$ are presented on the main diagonal, and the divisions by the cross products of $C_i$ are presented in the remainder of the matrix. Also present is a factor 4 which multiplies all the elements.

As previously mentioned, the calculation of the DCT is followed by the quantization phase. Therefore, the need to have the proper values of the coefficients calculated in the previous DCT phase reset can be avoided by including the division and multiplication operations, required for adjustment purposes, to the quantization coefficients.

The above technique can be further utilized to advantage through an efficient construction of the code. For the purpose, a description in machine language, i.e., assembly language, of the algorithm has been used so that by exploiting the hardware features the time taken to calculate the algorithm could be improved. As for the quantization phase, the luminance and chrominance blocks are handled differently due to the different informational contents. The following are the quantization tables used as recommended by the JPEG Standard:

TABLE 1

Quantization table for luminance

| 16 | 11 | 10 | 16 | 24 | 40 | 51 | 61 |
|----|----|----|----|----|-----|-----|-----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

TABLE 2

Quantization table for chrominance

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

The quantization phase is performed by divisions which, however, can be converted to multiplications. This is where $Q(u,v)$ are the elements in the above tables:

$$S^Q(v,u) = \frac{S(v,u)}{Q(v,u)} = S(v,u)\left(\frac{1}{Q(v,u)}\right)$$

However, if the algorithm is to be applied in its entirety, the remaining terms in $S(u,v)$ should be removed at the end of the DCT transformation operation. Therefore, the correct operation becomes:

$$S^Q(v,u) = \tilde{S}(v,u)\left(\frac{1}{Q(v,u)}\right)\frac{C_i C_j}{4}$$

where $\tilde{S}(v,u)$ is the result of the DCT.

Figure 2:
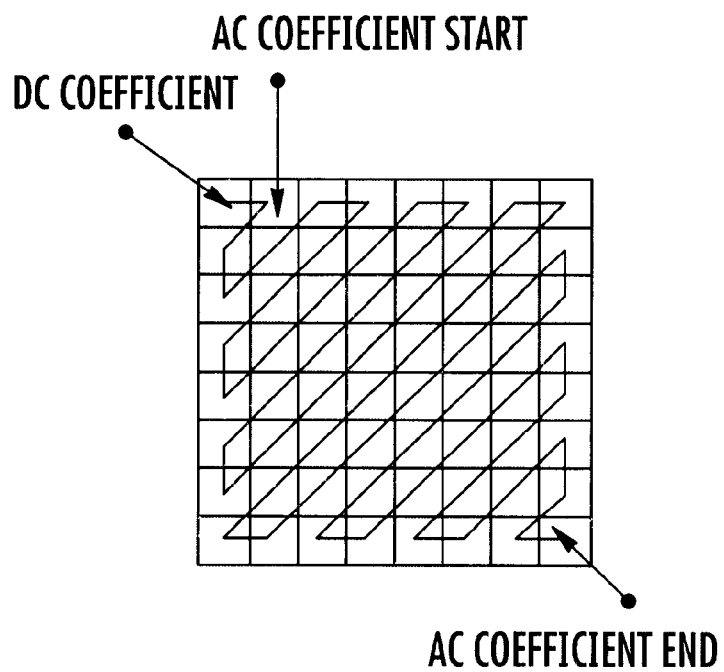
FIG. 2 is a scheme of how transformed data are processed in the circuit diagram illustrated in FIG. 1.

After carrying out the multiplication, everything must be brought back to the proper exponential base. That is, a division by a power of 2 must be carried out by a rightward shift through a corresponding number of places to the precision being used. The result thus obtained will be an integer which represents the quantized DCT coefficients, which are then included in the 8×8 output block in a zig-zag pattern as shown in FIG. 2.

The inventive method and circuit architecture achieve many advantages; such as a providing a faster calculation of the DCT; an efficient use of the circuit architecture does not require any additional hardware provisions; and there is no need for a floating-point multiplier.

That which is claimed is:

1. A method for computing a Discrete Cosine Transform (DCT) comprising:
   processing a matrix of sampled data producing first and second unidimensional transforms using an algorithm, the first unidimensional transform being computed using an accumulation multiplier;
   processing the first unidimensional transform using the second unidimensional transform; and
   performing a quantization on the second unidimensional transform.

2. A method according to claim 1, wherein processing the first unidimensional transform using the second unidimensional transform generates coefficients for the DCT as follows:

$$S(v,u) = \frac{C(v)}{2}\sum_{y=0}^{7}\cos\left[\frac{(2y+1)v\pi}{16}\right]t_u(y)$$

where
   $C(v) = 1/\sqrt{2}$, when $v=0$
   $C(v) = 1$, when $v>0$ $$t_u(y) = \frac{C(u)}{2}\sum_{x=0}^{7}s(y,x)\cos\left[\frac{(2x+1)u\pi}{16}\right],$$

and
   $s(y,x)$ are input data.

3. A method according to claim 1, wherein the accumulation multiplier comprises a parallel accumulation multiplier.

4. A method according to claim 1, wherein the DCT comprises coefficients corresponding to luminance and chrominance signals.

5. A method according to claim 1, wherein the DCT comprises coefficients; and wherein performing the quantization further comprises associating a multiplication factor of 2 with each coefficient after quantization.

6. A method according to claim 1, wherein the sampled data comprises coding for compression of digital video image data.

7. A method according to claim 1, wherein the DCT is computed in a microcontroller.

8. A method according to claim 1, wherein the DCT is computed in a fast image data signal processor.

9. A method for computing a Discrete Cosine Transform (DCT) comprising:
   processing a matrix of sampled data to produce first and second unidimensional transforms, the first transform being computed using an accumulation multiplier;
   processing the first unidimensional transform using the second unidimensional transform and generating coefficients for the DCT;
   performing a quantization on the second unidimensional transform; and
   associating a multiplication factor with each coefficient after quantization.

10. A method according to claim 9, wherein the coefficients for the DCT are generated as follows:

$$S(v,u) = \frac{C(v)}{2}\sum_{y=0}^{7}\cos\left[\frac{(2y+1)v\pi}{16}\right]t_u(y)$$

where
   $C(v) = 1/\sqrt{2}$, when $v=0$
   $C(v) = 1$, when $v>0$ $$t_u(y) = \frac{C(u)}{2}\sum_{x=0}^{7}s(y,x)\cos\left[\frac{(2x+1)u\pi}{16}\right],$$

and
   $s(y,x)$ are input data.

11. A method according to claim 9, wherein the processing is performed using a fast algorithm.

12. A method according to claim 9, wherein the multiplication factor is 2.

13. A method according to claim 9, wherein the coefficients of the DCT correspond to luminance and chrominance signals.

14. A method according to claim 9, wherein the accumulation multiplier comprises a parallel accumulation multiplier.

15. A method according to claim 9, wherein the sampled data comprises coding corresponding to compression of digital video image data.

16. A method according to claim 9, wherein the DCT is computed in a microcontroller.

17. A method according to claim 9, wherein the DCT is computed in a fast image data signal processor.

18. A microcontroller comprising:
- an accumulation multiplier processing a matrix of sampled data to produce a first unidimensional transform;
- a first module processing the matrix of sampled data to produce a second unidimensional transform and for processing the first unidimensional transform using the second unidimensional transform; and
- a second module performing a quantization on the second unidimensional transform for computing a Discrete Cosine Transform (DCT) of the sampled data.

19. A microcontroller according to claim 18, wherein said accumulation multiplier comprises a parallel accumulation multiplier.

20. A microcontroller according to claim 18, further comprising an algorithm for calculating coefficients of the DCT as follows:

$$S(v, u) = \frac{C(v)}{2} \sum_{y=0}^{7} \cos\left[\frac{(2y+1)v\pi}{16}\right] t_u(y)$$

where
C(v)=1/√2, when v=0
C(v)=1, when v>0

$$t_u(y) = \frac{C(u)}{2} \sum_{x=0}^{7} s(y, x) \cos\left[\frac{(2x+1)u\pi}{16}\right],$$

and
s(y,x) are input data.

21. A microcontroller according to claim 18, wherein the DCT comprises coefficients corresponding to luminance and chrominance signals.

22. A microcontroller according to claim 18, wherein the DCT comprises coefficients, and wherein said second module associates a multiplication factor of 2 with each coefficient after quantization.

23. A microcontroller according to claim 18, wherein the sampled data comprises coding for compression of digital video image data.

24. A microcontroller according to claim 18, wherein said accumulation multiplier comprises a parallel accumulation multiplier.

25. A microcontroller according to claim 18, further comprising an algorithm for calculating the coefficients of the DCT as follows:

$$S(v, u) = \frac{C(v)}{2} \sum_{y=0}^{7} \cos\left[\frac{(2y+1)v\pi}{16}\right] t_u(y)$$

where
C(v) 1/√2, when v=0
C(v)=1, when v>0

$$t_u(y) = \frac{C(u)}{2} \sum_{x=0}^{7} s(y, x) \cos\left[\frac{(2x+1)u\pi}{16}\right],$$

and
s(y,x) are input data.

26. A microcontroller comprising:
- an accumulation multiplier processing a matrix of sampled data to produce a first unidimensional transform;
- a first module processing the matrix of sampled data to produce a second unidimensional transform and for processing the first unidimensional transform using the second unidimensional transform and generating coefficients for a Discrete Cosine Transform (DCT);
- a second module performing a quantization on the second unidimensional transform for computing the DCT of the sampled data; and
- a third module associating a multiplication factor with each coefficient after quantization.

27. A microcontroller according to claim 24, wherein the coefficients correspond to luminance and chrominance signals.

28. A microcontroller according to claim 24, wherein said third module associates a multiplication factor of 2 with each coefficient after quantization.

29. A microcontroller according to claim 24, wherein the sampled data comprises coding for compression of digital video image data.

* * * * *